United States Patent [19]

Akerson

[11] 4,361,959
[45] Dec. 7, 1982

[54] BRUSH CUTTER

[76] Inventor: John R. Akerson, Box 115, Grandy, Minn. 55029

[21] Appl. No.: 254,400

[22] Filed: Apr. 15, 1981

[51] Int. Cl.³ .............................................. A01G 3/00
[52] U.S. Cl. ......................................... 30/231; 30/241
[58] Field of Search ................... 56/27.5; 30/273, 231, 30/275, 296 R, 242, 240; 83/925 R

[56] References Cited

U.S. PATENT DOCUMENTS

| | | | |
|---|---|---|---|
| 216,915 | 6/1879 | Unkrich | 30/231 X |
| 746,964 | 12/1903 | Kearns | 30/242 |
| 1,800,081 | 4/1931 | Kishell | 30/273 X |
| 2,404,504 | 7/1946 | Klose | 30/240 X |
| 2,487,473 | 11/1949 | Peterson | 30/231 X |
| 2,580,831 | 1/1952 | Persak | 30/273 X |
| 3,910,144 | 10/1975 | Hess | 83/925 R |

Primary Examiner—Jimmy C. Peters
Attorney, Agent, or Firm—Haugen, Orrin M.; Thomas J. Nikolai

[57] ABSTRACT

A brush cutter including a first normally horizontal blade having a transverse slot, support structure including an elongated handle generally orthogonal to the blade to enable positioning of the slot about the base of a stalk to be cut, a second blade guided to slide on the first blade to move across the slot, a pedal pivoted to the support structure, and a linkage pivotally connecting the pedal to the second blade to cause the second blade to slide. In a first embodiment the sliding is linear, and in a second embodiment the sliding is rotary.

8 Claims, 6 Drawing Figures

BRUSH CUTTER

TECHNICAL FIELD

This invention relates to the general field of forestry, and particularly to man-powered equipment for cutting brush and the like.

BACKGROUND OF THE INVENTION

In the practice of forestry, and generally in estate maintenance, it is necessary to cut brush, whether as a thinning operation or to clear land for other use. Many forms of brush cutters have been devised, some of which are adapted for operation by electric motors or internal combustion engines, while others are actuated by man power.

It is of course desirable that the stalks be cut at ground level, to avoid the inconvenience of residual upwardly projecting stumps, which would interfere with subsequent mowing operations, for example.

SUMMARY OF THE INVENTION

The present invention comprises a tool by which a user may sever brush substantially at the ground level while himself remaining erect, the tool being positioned by an elongated handle, the cutter comprising a pair of blades arranged for relative linear or rotary sliding motion and the motion being accomplished through a foot pedal by the user's leg muscles or his weight.

Various advantages and features of novelty which characterize the invention are pointed out with particularity in the claims annexed hereto and forming a part hereof. However, for a better understanding of the invention, its advantages, and objects obtained by its use, reference should be had to the drawing which forms a further part hereof, and to the accompanying descriptive matter, in which there are illustrated and described certain preferred embodiments of the invention.

BRIEF DESCRIPTION OF THE DRAWING

In the drawing, in which like reference numerals indicate corresponding parts throughout the several views.

DESCRIPTION OF A FIRST EMBODIMENT

Figure 1:
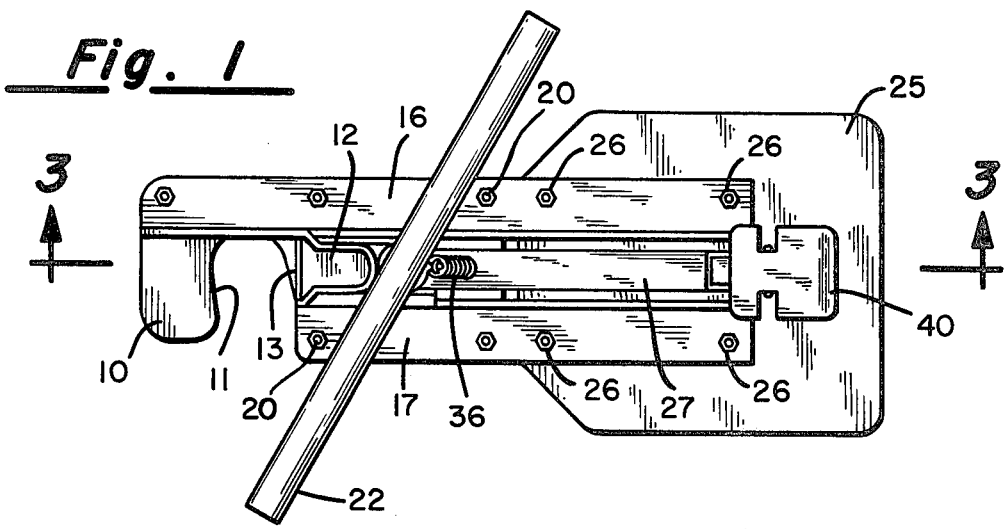
FIGS. 1 and 2 are views in plan and side elevation of a brush cutter according to the invention.
Figure 2:
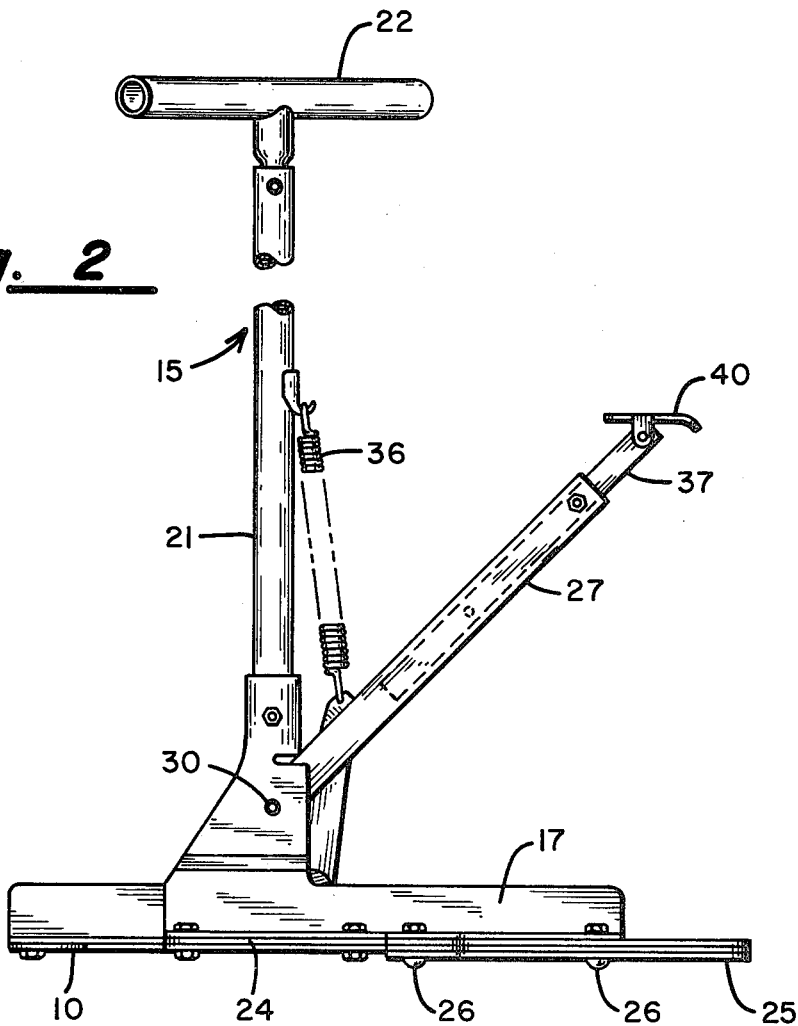
Figure 3:
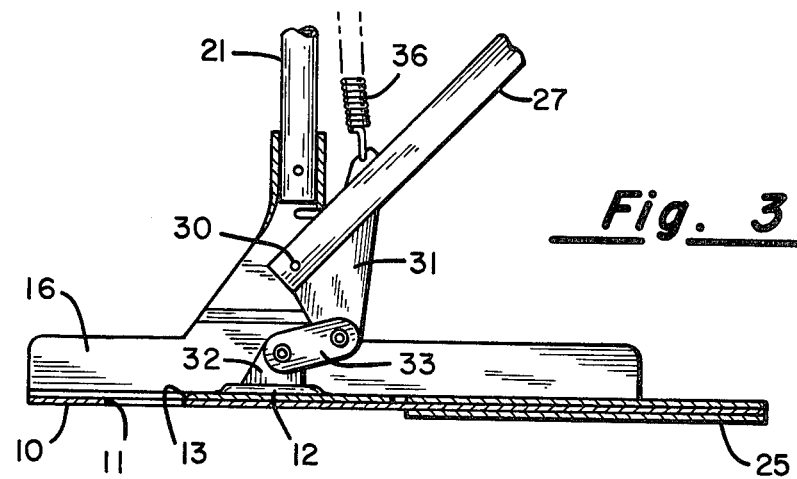
FIG. 3 is a fragmentary view in section along the line 3—3 of FIG. 1.
Figure 4:
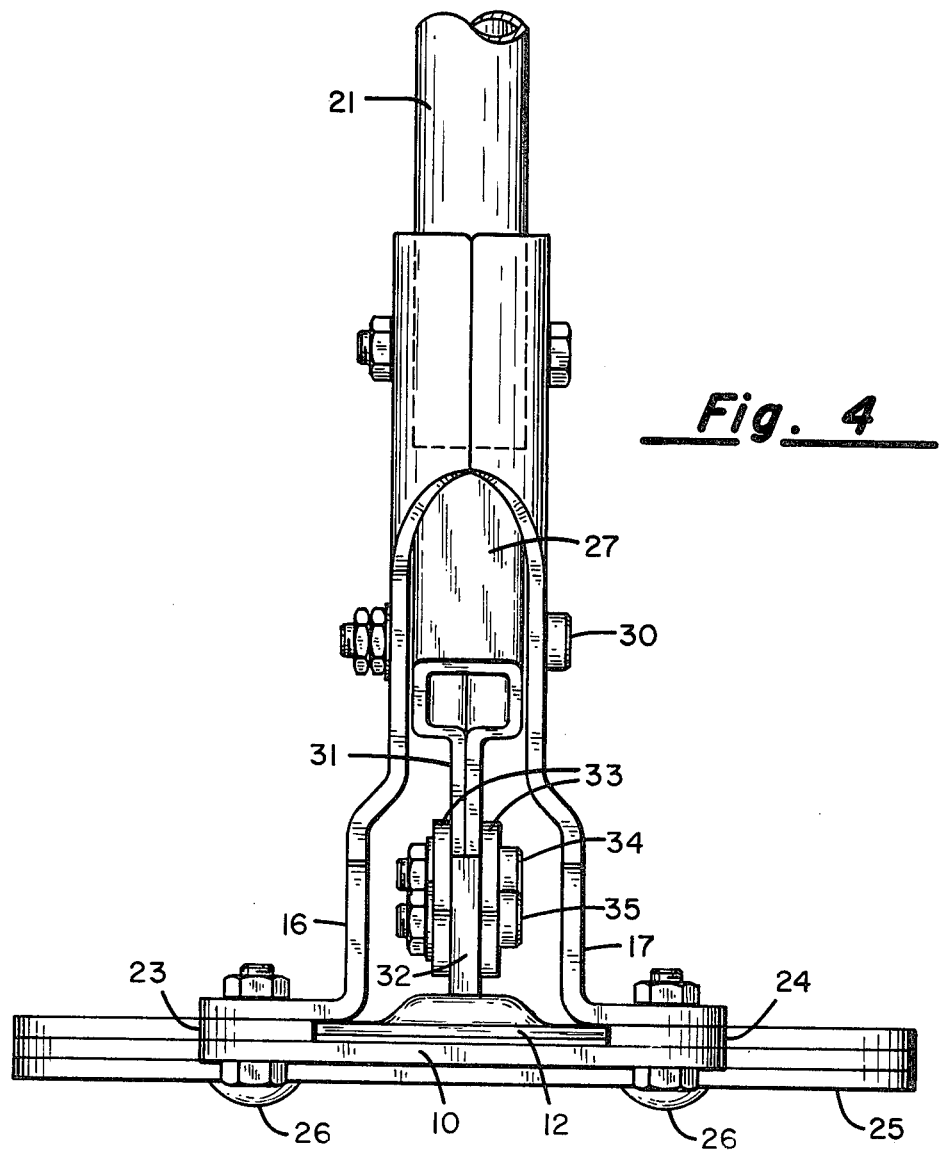
FIG. 4 is a fragmentary end view of the invention in elevation.

A brush cutter according to the invention comprises a first, normally horizontal flat blade 10 having a transverse slot 11 sized to receive the stalks of brush to be cut. A second flat blade 12 is slidable on blade 10, and has a sharp cutting edge 13 in apposition to the slot. The cutter may be supported and manipulated by a handle 15 mounted on blade 10 by support members 16 and 17 and fasteners 20. For convenience, handle 15 may be made separable to include a shaft 21 and a removable cross member 22. Spacers 23 and 24 are provided between blade 10 and support members 16 and 17 to guide blade 12 in sliding movement, so that edge 13 moves across slit 11, which need not have a sharp edge. The support members are continued beyond blade 10 to mount a ground-engaging base pad 25 by fasteners 26.

A foot lever or pedal 27 is pivoted in support members 16 and 17 on a fastener 30, and includes a downwardly projecting lug 31. Blade 12 has an upwardly projecting lug 32, and the lugs are interconnected by a link 33 at pivot pins 34 and 35 so that pivotal movement of pedal 27 about fastener 30 results in sliding movement of blade 12 on blade 10. A spring 36 is connected between handle 15 and pedal 27 to maintain the second blade normally in a position clear of slot 11.

Pedal 27 includes a telescopic extension 37 to enable increase in the leverage obtainable at a treadle 40 when stalks of maximum size are to be severed.

OPERATION OF THE FIRST EMBODIMENT

The brush cutter described above is readily portable, and is carried to the location of the brush to be removed. By manipulation of handle 15, the user positions blade 10 so that slot 11 receives a stalk to be cut. Then by foot pressure, or by body weight, the user depresses treadle 40 so that blade 12 moves across slot 11 and severs the stalk contained therein. This is done without any bending or stooping by the user, and since the severing force is provided by the user's leg muscles or body weight, the tool can be used for long periods of time with very little fatigue.

DESCRIPTION OF A SECOND EMBODIMENT

Figure 5:
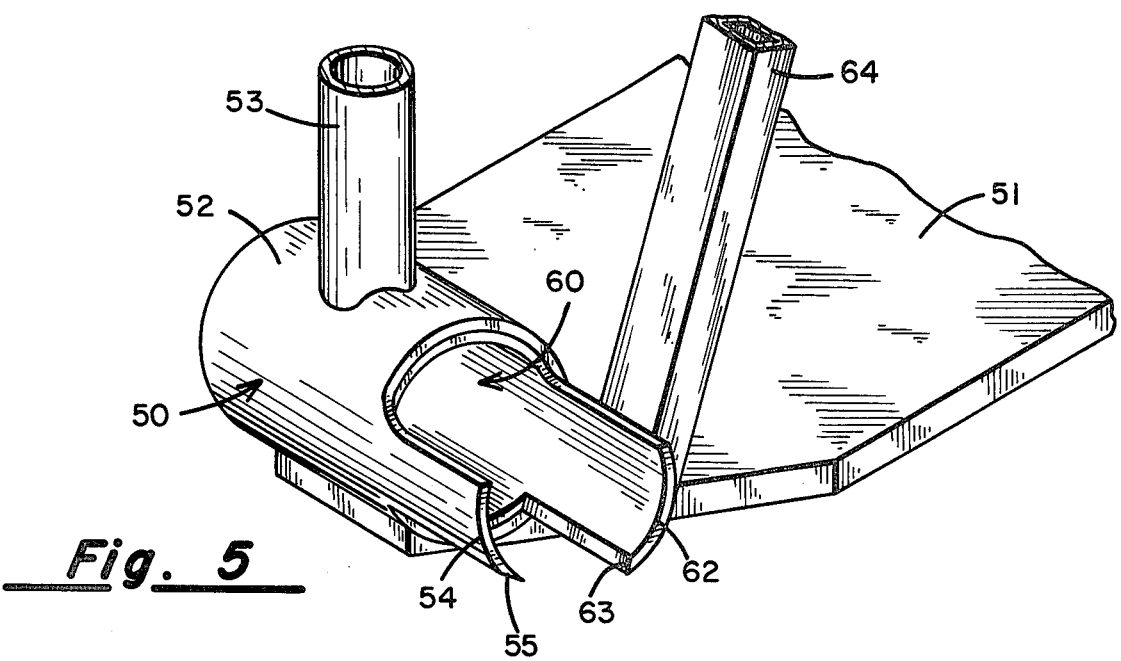
FIGS. 5 and 6 show a second embodiment of the invention.
Figure 6:
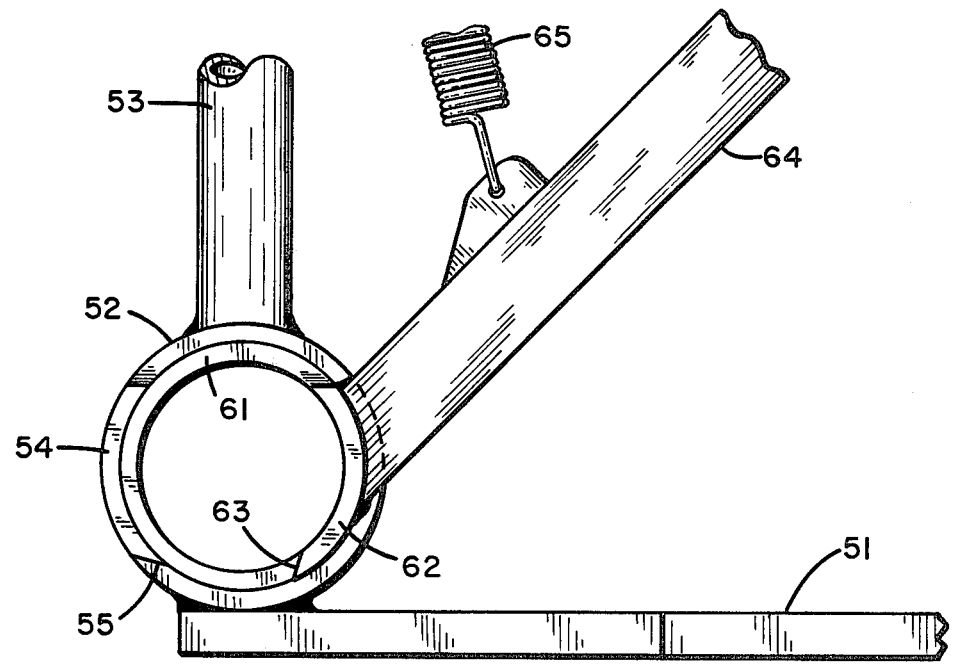

In the embodiment of the invention discussed above, the sliding movement between blades is linear. As second embodiment of the invention shown in FIGS. 5 and 6, is arranged for rotary rather than linear sliding between the cutter elements.

Here a first blade 50 is secured to a ground-engaging base pad 51, as by welding, and comprises a hollow cylindrical body 52 to which a handle 53 is secured. The axis of the body is normally horizontal, and a portion of the body is cut away leaving a arcuate projection or lug 54 which may be given a sharpened edge 55 if desired.

A second blade 60 of this cutter also includes a cylindrical body 61, which is sized for smooth rotary sliding in body 52, in which it is secured by conventional means, not shown. Body 61 has one portion cut away to leave an arcuate projection or lug 62, which has a sharpened edge 63. A pedal 64 is welded to body 61, and is connected by a spring 65 to handle 53 to hold lugs 54 and 62 normally in the position shown in FIG. 5.

OPERATION OF THE SECOND EMBODIMENT

In use, the device is positioned with pad 51 resting on the ground, with a stalk to be cut projecting upwardly through the gap between lugs 54 and 62. Pressure on pedal 64 causes blade 60 to slide within blade 50 with a rotary motion, so that edge 63 approaches edge 55 and severs the stalk.

Numerous characteristics and advantages of the invention have been set forth in the foregoing description, together with details of the structure and function of the invention, and the novel features thereof are pointed out in the appended claims. The disclosure, however, is illustrative only, and changes may be made in detail especially in matters of shape, size, and arrangement of parts, within the principle of the invention, to the full extent indicated by the broad general meaning of the terms in which the appended claims are expressed.

I claim:

1. A brush cutter for enabling a user to cut brush at the ground level while remaining erect, comprising, in combination:
   a first normally horizontal blade having a first transverse edge;
   support means, including an elongated handle generally orthogonal to said blade, to enable positioning of said edge against a stalk to be cut;
   a second blade having a second transverse edge;
   means guiding said second blade for sliding with respect to said first blade, to bring said transverse edges together and thus sever a stalk positioned therebetween; and
   a pedal connected to said second blade to cause sliding thereof.

2. A brush cutter for enabling a user to cut brush at the ground level while remaining erect, comprising, in combination:
   a first normally horizontal flat blade having a transverse slot;
   support means, including an elongated handle generally orthogonal to said blade, to enable positioning of said slot around the base of a stalk to be cut;
   a second flat blade;
   means guiding said second blade for sliding on said first blade to move across said slot and thus sever a stalk positioned therein;
   a pedal pivoted to said support means; and
   a linkage pivotally connecting said pedal to said second blade to cause said sliding of said second blade.

3. A cutter according to claim 2, and means resiliently opposing operation of said pedal to normally retain said second blade clear of said slot.

4. A brush cutter according to claim 2 and means for varying the leverage afforded by said pedal.

5. A brush cutter according to claim 3 and means for varying the leverage afforded by said pedal.

6. A brush cutter according to claim 2 in which one of said blades has a sharp cutting edge for engaging a stalk in said slot.

7. A brush cutter according to claim 2 in which said second blade has a sharp cutting edge which moves across said slot.

8. A brush cutter according to claim 1 wherein said first blade comprises a cylindrical tube having said first transverse edge formed at one end thereof to extend parallel to the normally horizontal axis of the cylinder, and said second blade comprises a second cylindrical tube coaxially disposed within said first tube for rotary sliding therein, and the said second transverse edge is formed at one end thereof to extend parallel to said axis in opposition to said first transverse edge.

* * * * *